United States Patent
Yamakami

(10) Patent No.: US 12,294,272 B2
(45) Date of Patent: May 6, 2025

(54) OSCILLATORY ACTUATOR

(71) Applicant: Foster Electric Company, Limited, Tokyo (JP)

(72) Inventor: Ken Yamakami, Tokyo (JP)

(73) Assignee: FOSTER ELECTRIC COMPANY, LIMITED, Tokyo (JP)

( * ) Notice: Subject to any disclaimer, the term of this patent is extended or adjusted under 35 U.S.C. 154(b) by 256 days.

(21) Appl. No.: 18/003,795

(22) PCT Filed: Jul. 2, 2020

(86) PCT No.: PCT/JP2020/026096
§ 371 (c)(1),
(2) Date: Dec. 29, 2022

(87) PCT Pub. No.: WO2022/003921
PCT Pub. Date: Jan. 6, 2022

(65) Prior Publication Data
US 2023/0336064 A1   Oct. 19, 2023

(51) Int. Cl.
*H02K 33/16* (2006.01)
(52) U.S. Cl.
CPC .................. *H02K 33/16* (2013.01)
(58) Field of Classification Search
CPC ....................................... H02K 33/16
See application file for complete search history.

(56) References Cited

U.S. PATENT DOCUMENTS

| | | | |
|---|---|---|---|
| 2013/0272550 A1 | 10/2013 | Furuichi et al. | |
| 2014/0117788 A1* | 5/2014 | Takahashi | A61C 17/3481 310/38 |
| 2019/0296627 A1 | 9/2019 | Takahashi et al. | |

(Continued)

FOREIGN PATENT DOCUMENTS

| | | |
|---|---|---|
| JP | 20067161 A | 1/2006 |
| JP | 2013223334 A | 10/2013 |
| JP | 2019170118 A | 10/2019 |

(Continued)

OTHER PUBLICATIONS

Japan Patent Office Searching Authority; International Search Report and Written Opinion for PCT/JP2020/026096; Sep. 24, 2020; entire document.

(Continued)

*Primary Examiner* — Forrest M Phillips
(74) *Attorney, Agent, or Firm* — ALLEN, DYER, DOPPELT + GILCHRIST, P.A.

(57) ABSTRACT

An oscillatory actuator 1 includes: an in-case electromagnetic driver 3; a mover 4; and a pair of leaf springs 5a and 5b for supporting the mover 4. The mover 4 includes a magnet 30, pole pieces 31a and 31b paired, and masses 32a and 32b paired. The in-case electromagnetic driver 3 includes coils 21a and 21b paired and a tubular yoke 20 radially outside the coils 21a and 21b, the yoke being made of a soft magnetic material and projecting outward beyond the coils 21a and 21b along the oscillation axis O. Along the oscillation axis O, an average length Ly of the yoke O is equal to or longer than the sum of an end-to-end length Lp of the pole pieces 31a and 31b paired and the double of a one-way amplitude La of an oscillation of the mover 4, i.e., Ly≥the sum (Lp+2La).

20 Claims, 9 Drawing Sheets

(56) References Cited

U.S. PATENT DOCUMENTS

2021/0351680 A1   11/2021   Chiba et al.

FOREIGN PATENT DOCUMENTS

| JP | 202054018 A | | 4/2020 |
|---|---|---|---|
| JP | 2022174233 A | * | 11/2022 |
| WO | WO2020045470 A1 | | 3/2020 |

OTHER PUBLICATIONS

Japan Patet Office; Notice of Reasons for Refusal; Japanese Patent Application No. 2021-537174; Jun. 23, 2022; entire document.

* cited by examiner

FIG.7

| Model Nos. | Areas | Feature Points (mm) | Outer Diameter Dp of Pole Piece (mm) | Inner Diameter Dy of Yoke (mm) | Inner Diameter of Yoke/Outer Diameter of Pole Piece Dy/Dp | Second Force Coefficient BL2 at Second Yoke Length Ly2 of 10.5 mm | First Force Coefficient BL1 at First Yoke Length Ly1 of 16 mm | Force Coefficient Decreasing Rate From First to Second Force Coefficients BL1 to BL2 |
|---|---|---|---|---|---|---|---|---|
| 1 | A1 | Outer Diameter Dm of Magnet: φ13 | 13.9 | 18.6 | 1.338 | 1.642 | 1.724 | -4.80% |
| 2 | A2 | Outer Diameter Dm of Magnet: φ14.4 | 14.5 | 18.6 | 1.283 | 2.167 | 2.227 | -2.67% |
| 3 | A2 | Outer Diameter Dm of Magnet: φ14 | 14.5 | 18.6 | 1.283 | 2.067 | 2.126 | -2.76% |
| 4 | A2 | Outer Diameter Dm of Magnet: φ13.6 | 14.5 | 18.6 | 1.283 | 1.972 | 2.031 | -2.91% |
| 5 | A2 | Outer Diameter Dm of Magnet: φ14.4 | 14.9 | 18.6 | 1.248 | 2.314 | 2.374 | -2.52% |
| 6 | A2 | Outer Diameter Dm of Magnet: φ14 | 14.9 | 18.6 | 1.248 | 2.218 | 2.277 | -2.56% |
| 7 | A2 | Outer Diameter Dm of Magnet: φ13.6 | 14.9 | 18.6 | 1.248 | 2.110 | 2.168 | -2.66% |
| 8 | A2 | Outer Diameter Dm of Magnet: φ14.4 | 15.3 | 18.6 | 1.216 | 2.471 | 2.531 | -2.35% |
| 9 | A2 | Outer Diameter Dm of Magnet: φ14 | 15.3 | 18.6 | 1.216 | 2.352 | 2.410 | -2.40% |
| 10 | A2 | Outer Diameter Dm of Magnet: φ13.6 | 15.3 | 18.6 | 1.216 | 2.268 | 2.324 | -2.44% |
| 11 | A3 | Outer Diameter Dm of Magnet: φ15.8 | 15.9 | 18.6 | 1.170 | 3.181 | 3.251 | -2.15% |
| 12 | A3 | Outer Diameter Dm of Magnet: φ15 | 15.9 | 18.6 | 1.170 | 2.939 | 3.002 | -2.12% |
| 13 | A2 | Inner Diameter Dy of Yoke: φ19.1 | 14.9 | 19.1 | 1.282 | 2.110 | 2.172 | -2.85% |
| 14 | A4 | Inner Diameter Dy of Yoke: φ19.6 | 14.9 | 19.6 | 1.315 | 2.001 | 2.083 | -3.94% |

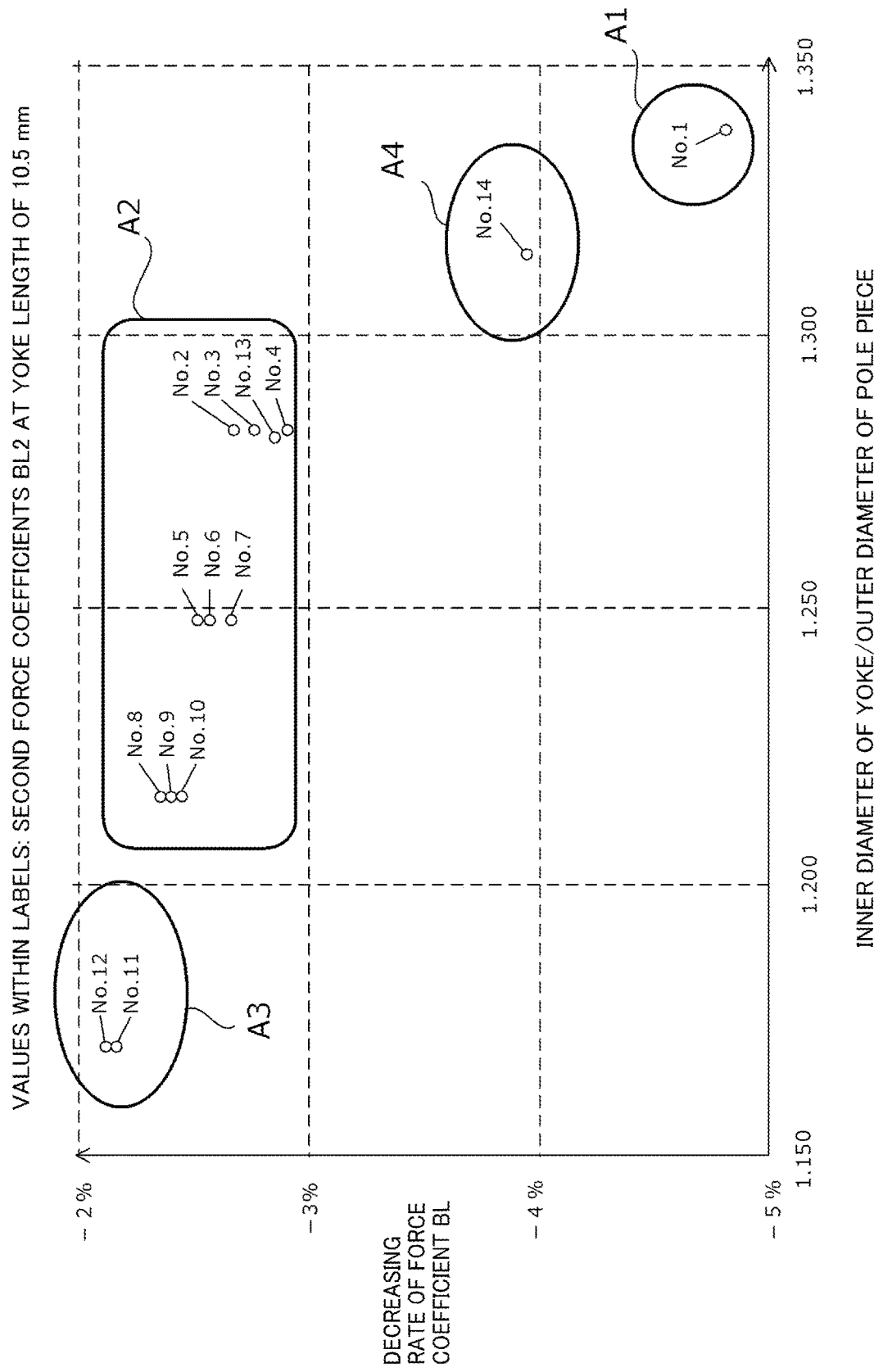

OSCILLATORY ACTUATOR

CROSS-REFERENCE TO RELATED APPLICATIONS

This application is the § 371 National Stage Entry of International Application No. PCT/JP2020/026096, filed on Jul. 2, 2020, the contents of which application is herein incorporated by reference in its entirety.

FIELD OF THE INVENTION

The present invention relates to an oscillatory actuator.

BACKGROUND OF THE INVENTION

Some conventional methods for notifying a person of incoming calls and alarms in communication devices such as cell phones utilize oscillation of an oscillatory actuator (or oscillatory motor). In recent years, oscillatory actuators have been also used in the fields of movies, games, and virtual reality (VR) utilize, for example, as devices for producing dramatic effects in action scenes or feedbacks to players, providing people with reality enhanced by stimulating their tactile sensation through oscillation.

Some conventional oscillatory actuators employ the rotation of an eccentric mass using a motor to generate oscillations with a fictitious force. Meanwhile, some products employ a voice coil oscillatory actuator that generates quick-responsive oscillations, providing a realistic tactile sensation. For example, an oscillatory actuator according to Patent Document 1 is configured to electrically oscillate a mover (i.e., the "movable member" in Patent Document 1) such as a weight reciprocally, the mover being supported within a case by leaf springs.

CITATION LIST

Patent Document

Patent Document 1: Japanese Unexamined Patent Publication No. 2019-170118.

SUMMARY OF THE INVENTION

Meanwhile, oscillatory actuators have required further miniaturization to improve their mountability to small devices. On the other hand, such oscillatory actuators should be capable of generating a driving force for generating sufficient oscillations. That is, there is a demand for a miniaturized oscillatory actuator capable of generating a sufficient driving force.

The present invention was made to solve such problems. It is an object of the present invention to provide a miniaturized oscillatory actuator capable of generating a sufficient driving force.

In order to achieve the object, an oscillatory actuator includes: a case made of a non-magnetic material; an electromagnetic driver in a tubular shape inside the case; a mover disposed radially inside the electromagnetic driver and oscillatably supported along an oscillation axis; and a pair of leaf springs each configured to support either oscillation-axial end of the mover, the mover including a magnet, a pair of pole pieces being made of a soft magnetic material and sandwiching the magnet from either side in the oscillation axis, and a pair of weights being made of a non-magnetic material and sandwiching the pair of pole pieces from either side in the oscillation axis, the electromagnetic driver including a pair of coils, each in a cylindrical shape, spaced apart from each other along the oscillation axis, and a yoke in a tubular shape disposed radially outside the pair of coils, the yoke being made of a soft magnetic material and projecting outward beyond the pair of coils along the oscillation axis, and along the oscillation axis, the yoke having an average length greater than or equal to a sum of an end-to-end length of the pair of pole pieces and the double of a one-way amplitude of oscillation of the mover.

In the oscillatory actuator described above, along the oscillation axis, the average length of the yoke may be smaller than or equal to a sum of the end-to-length end of the pair of pole pieces and the quadruple of the amplitude of the oscillation of the mover.

In the oscillatory actuator described above, the yoke may have an inner diameter greater than an outer diameter of the pole pieces by of 1.3 times or fewer.

In the oscillatory actuator described above, the yoke may have an inner diameter greater than the outer diameter of the pole pieces by 1.2 times or more.

In the oscillatory actuator described above, centers of the pair of coils in the direction of the oscillation axis may be more outward in the direction of the oscillation axis than centers of the pole pieces at same ends in a non-oscillatory state.

In the oscillatory actuator described above, the yoke with edges in the direction of the oscillation axis may have one or more cutouts along each of the edges, and a total area of the cutouts of the one edge of the yoke is equal to a total area of the cutouts along the other edge.

The oscillatory actuator according to the present invention using the means described above generates a sufficient driving force of oscillations, while being miniaturized.

BRIEF DESCRIPTION OF THE DRAWINGS

FIG. 7 is a table showing the force coefficients BL of oscillatory actuator models with different yoke inner diameters, pole piece outer diameters, magnet outer diameters, and yoke thickness.

FIG. 8 is a graph showing the decreasing rate of the force coefficient from a first yoke length Ly1 to a second yoke length Ly2 in each of the oscillatory actuator models show in in FIG. 7.

DETAILED DESCRIPTION OF PREFERRED EMBODIMENTS

The following describes one embodiment of the present invention with reference to the drawings.

Figure 1:
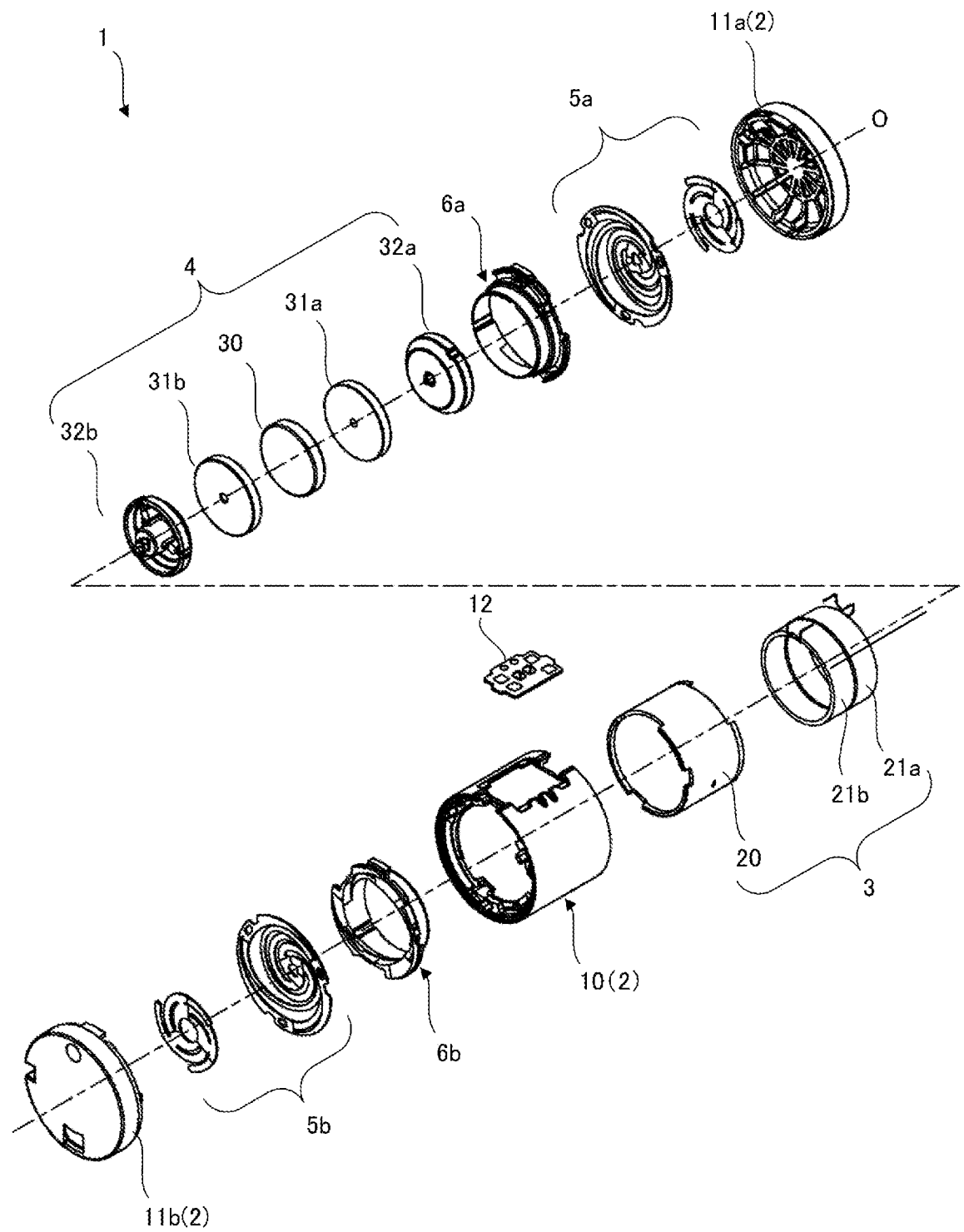
FIG. 1 is an exploded perspective view of an oscillatory actuator according to the embodiment of the present invention.
Figure 2:
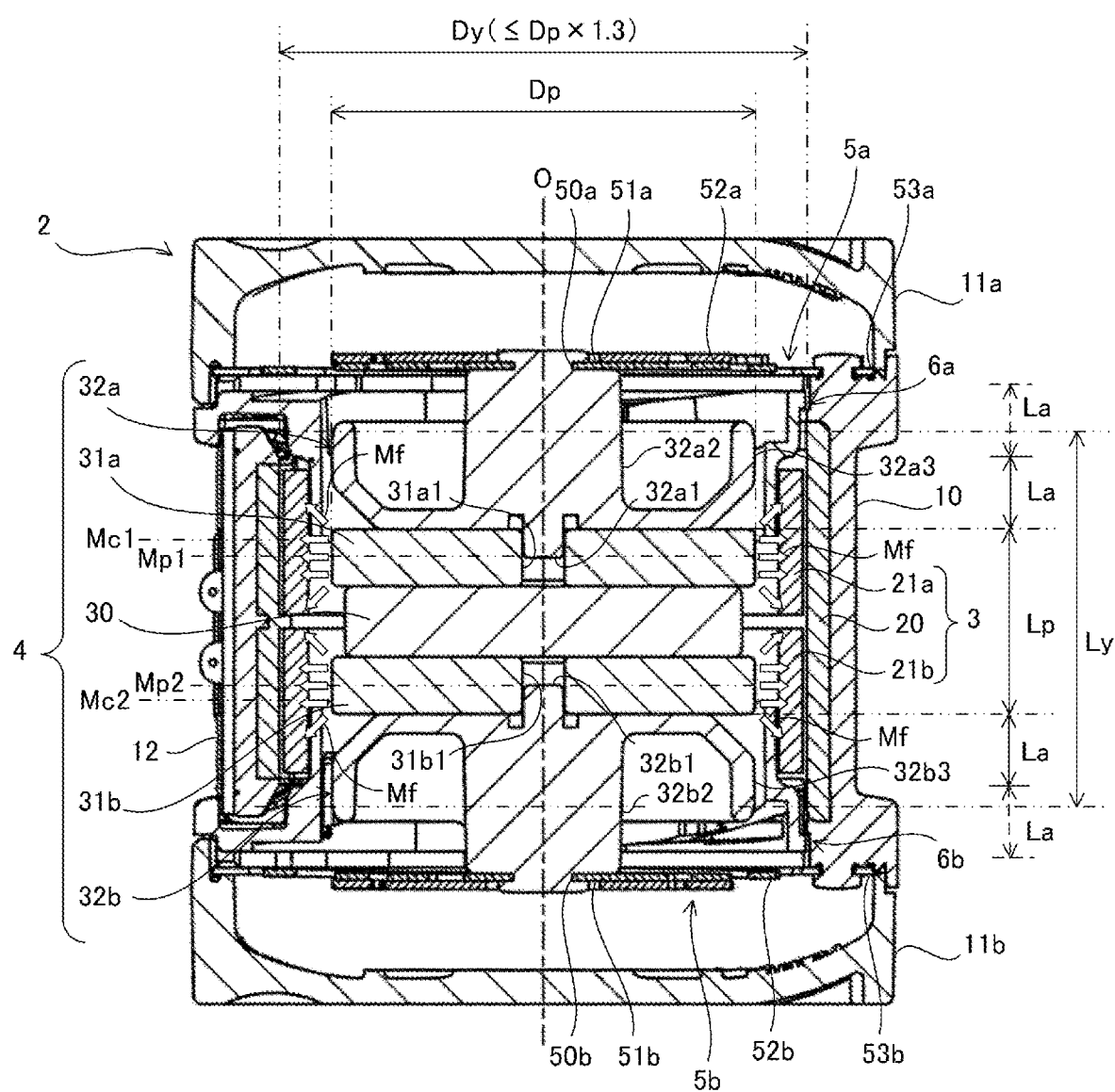
FIG. 2 is a longitudinal sectional view of the oscillatory actuator according to the embodiment of the present invention.
Figure 3:
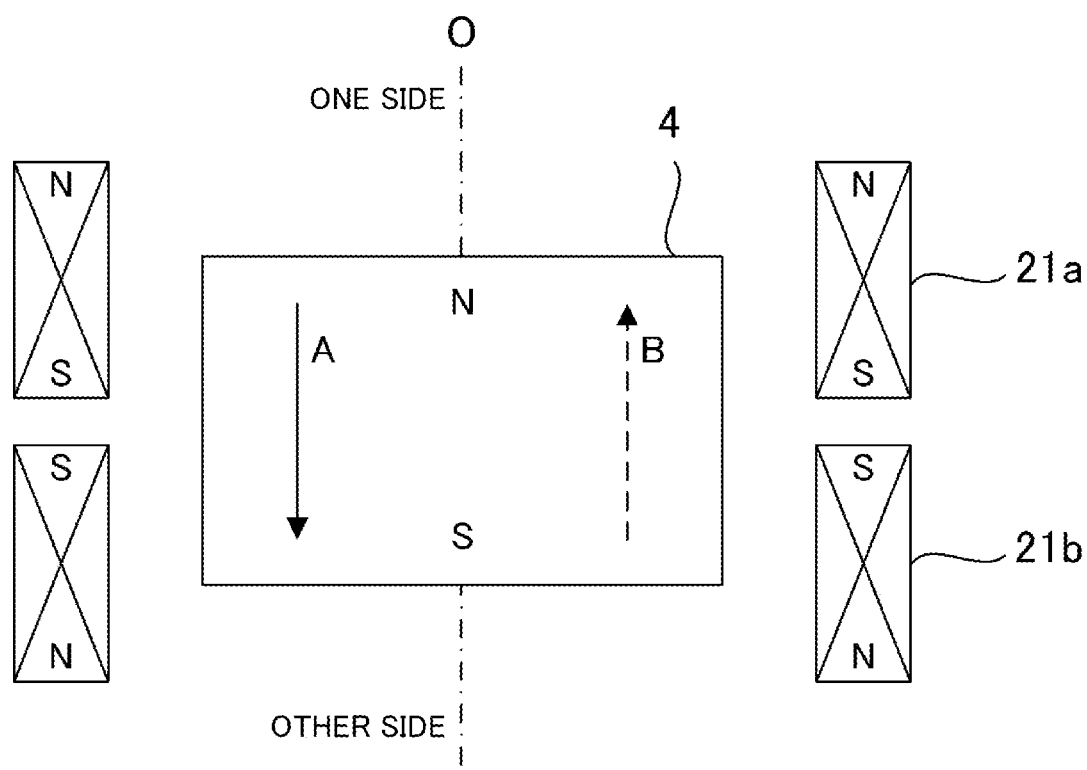
FIG. 3 illustrates an operation of the oscillatory actuator.
Figure 4A:
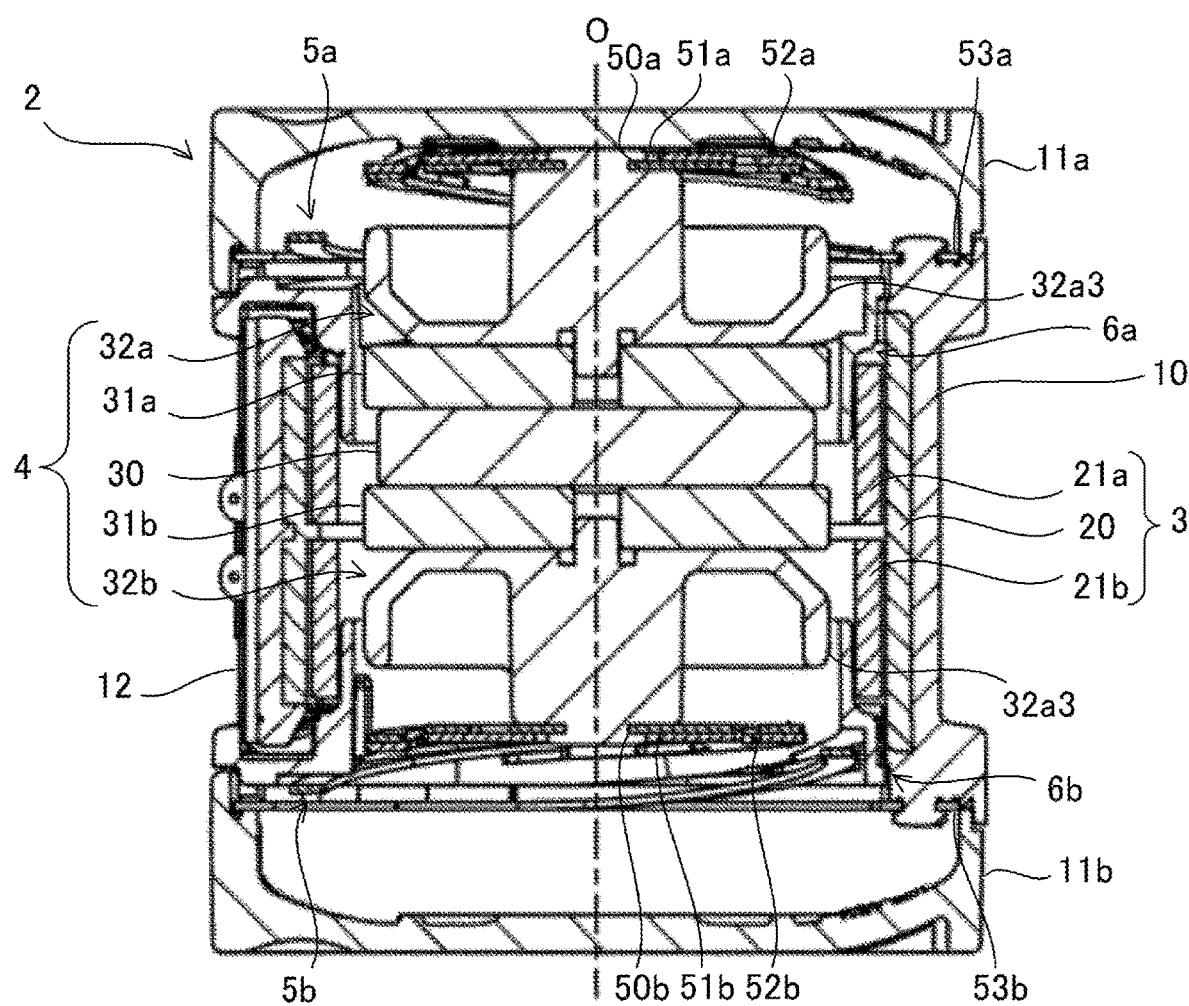
FIG. 4A is a cross-sectional view illustrating the mover after having moved in one way along an oscillation axis.
Figure 4B:
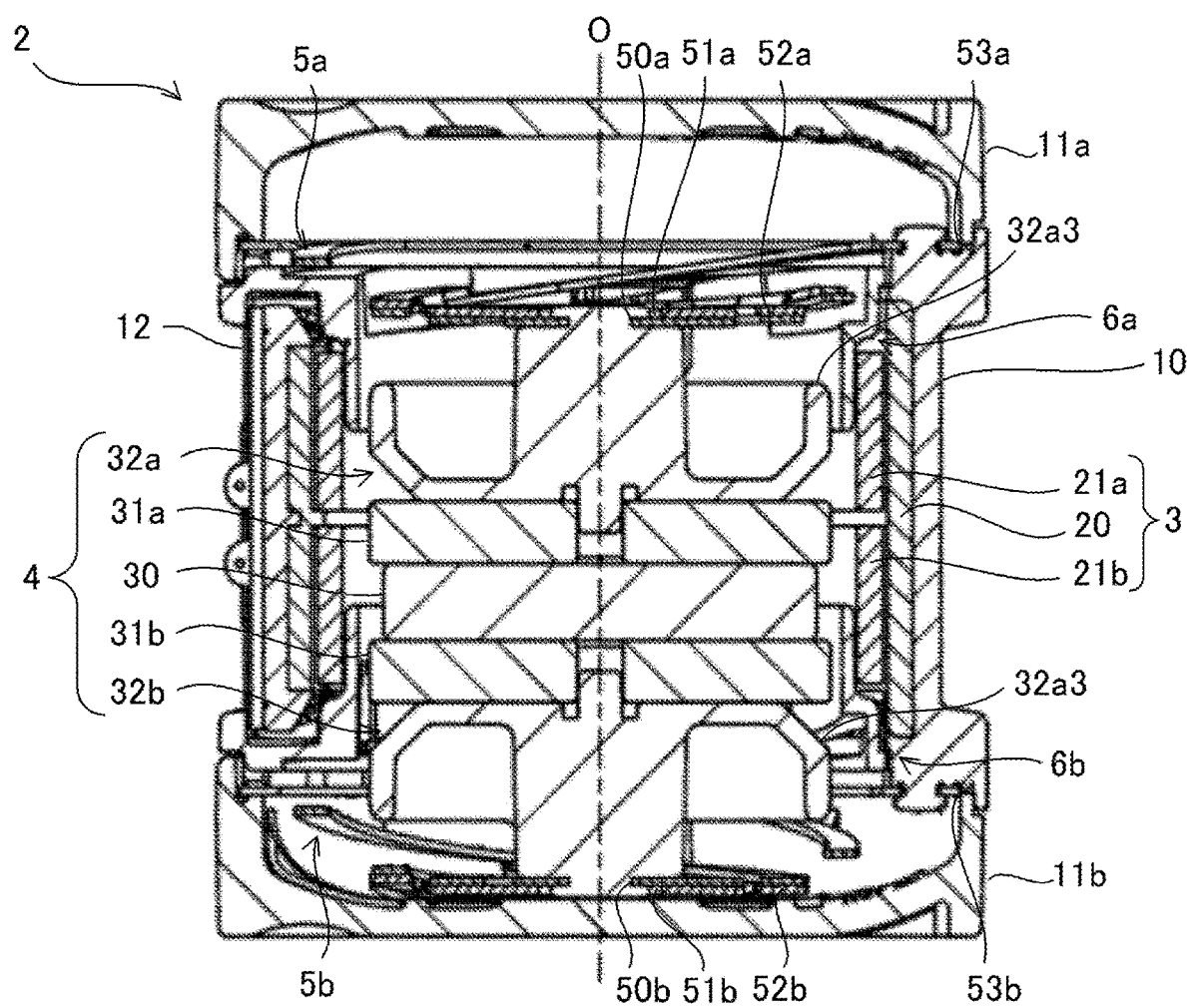
FIG. 4B is a cross-sectional view illustrating the mover after having moved in the other way along an oscillation axis.

FIG. 1 is an exploded perspective view of an oscillatory actuator according to the embodiment of the present invention. FIG. 2 is a longitudinal sectional view of the oscillatory actuator. FIG. 3 illustrates an operation of the oscillatory actuator. FIG. 4A is a cross-sectional view illustrating the mover after having moved in one way along an oscillation axis. FIG. 4B is a cross-sectional view illustrating the mover after having moved in the other way along the oscillation axis. Hereinafter, a configuration of the oscillatory actuator will be described based on the drawings.

An oscillatory actuator 1 mainly includes: a tubular case 2 forming an outer shell; an in-case electromagnetic driver 3 inside the case 2; a mover 4 oscillatable by the in-case electromagnetic driver 3; and first and second leaf springs 5a and 5b each elastically supporting either end of the mover 4. The oscillatory actuator 1 is, for example, mounted in a mobile terminal, such as a cell phone or a smart phone, or in a controller of a gaming console.

The case 2 includes a cylindrical case body 10 and first and second cover cases 11a and 11b. The case body 10 has open ends each being closed by one of the first and second cover cases 11a and 11b. The case body 10, the first cover case 11a, and the second cover case 11b are each made of resin material, such as ABS. A terminal 12 for connecting with a lead wire (not shown) is provided on an outer surface of the case body 10.

The in-case electromagnetic driver 3 includes a yoke 20 and a pair of coils 21a and 21b. The mover 4 includes a magnet 30 and a pair of pole pieces 31a and 31b. More specifically, the yoke 20 in a cylindrical shape and of a soft magnetic material is provided along the inner circumference of the case 2, while the first and second coils 21a and 21b, being electrically isolated from the yoke 20, are attached to the inner circumference of the yoke 20.

The first and second coils 21a and 21b are wound around along the inner circumference of the yoke 20. Each of the first coil 21a and the second coil 21b is capable of generating a magnetic field when energized through the terminal 12. The first and second coils 21a and 21b may be fixed to the yoke 20, a first inner guide 6a, and a second inner guide 6b by an adhesive or the like.

The first and second coils 21a and 21b surround the mover 4 with a space from the mover 4. The mover 4 is so placed that the mover 4 is oscillatable along the oscillation axis O (i.e., along the axis of the case 2). The mover 4 includes: the magnet 30 in a disk-shape; the first and second pole pieces 31a and 31b in a disk-shape, and first and second masses (weights) 32a and 32b. The first and second pole pieces 31a and 31b sandwich the magnet 30. The first and second masses 32a and 32b sandwich the magnet 30, the first pole piece 31a, and the second pole piece 31b.

The magnet 30 is magnetized in the direction of the oscillation axis O. The first and second pole pieces 31a and 31b are made of a soft magnetic material and attached to the magnet 30, for example, by a magnetic attraction force of the magnet 30 and an adhesive or the like. The first and second pole pieces 31a and 31b are integrated respectively with the first or second mass 32a and 32b with center projections 32a1 and 32b1 of the first and second masses 32a and 32b inserted respectively in through-holes 31a1 and 31b1 provided at the centers of the first and second pole pieces 31a and 31b.

In this way, the magnet 30, the first pole piece 31a, the second pole piece 31b, the first mass 32a, and the second mass 32b constituting the mover 4 are integral with each other. Note that the magnet 30, the first pole piece 31a, the second pole piece 31b, the first mass 32a, and the second mass 32b are not necessarily attached by the magnetic attraction force or adhesive described above, but their integration may be achieved by fixing them by a mechanical means, such as screwing, or any other suitable means.

The first and second masses 32a and 32b are made of a non-magnetic material, and include cylindrical parts 32a2 and 32b2 and bottomed cylindrical parts 32a3 and 32b3, respectively. The cylindrical parts 32a2 and 32b2 extend along the oscillation axis O. The bottomed cylindrical parts 32a3 and 32b3 have a U-shaped cross section, which expands from a root of the cylindrical part 32a2 or 32b2 (i.e., from where the center in the oscillation axis O is located) in directions perpendicular to the oscillation axis O (hereinafter, the directions are referred to as radial directions), and opens outward in the direction of the oscillation axis (O).

The mover 4 configured as above includes oscillation-axial ends in the direction of the oscillation axis O, and these ends of the mover 4, which in other words are the tips 32a4 and 32b4 of the first and second masses 32a and 32b, are supported by the first and second leaf springs 5a and 5b, respectively.

The first and second leaf springs 5a and 5b each include an elastic member on one surface.

The first and second leaf springs 5a and 5b are connected to the first and second masses 32a and 32b of the mover 4 via holes 50a and 50b of the central supports 51a and 51b, respectively.

The first and second leaf springs 5a and 5b each include a plurality of arms 52a or 52b extending spirally from the central support 51a or 51b toward the outer circumference and eventually being connected to a loop like-shaped frame 53a or 53b. The first and second leaf springs 5a and 5b are connected to the case body 10 via the frame 53a or 53b.

The first and second leaf springs 5a and 5b each include one or a plurality of metal leaf springs which is one fabricated from, for example, a thin stainless-steel plate (as a spring material) in this embodiment. The material of the first and second leaf springs 5a and 5b is not limited to metal, but may be a composite material containing a resin or fibers in addition to metal. A desirable material of the first and second leaf springs 5a and 5b has a high resistance to fatigue and an excellent flexibility. The first and second leaf springs 5a and 5b include the elastic members, which deform to provide damping of the oscillations of the leaf springs 5a and 5b, respectively.

The first and second leaf springs 5a and 5b with such a configuration are each elastically deformable within prescribed ranges along the oscillation axis O and in intersecting directions thereof including the radial direction perpendicular to the oscillation axis O. Note that the prescribed ranges correspond to an oscillation range of the mover 4 in usual use of the oscillatory actuator 1. Accordingly, the prescribed ranges are such ranges that at least none of the first and second leaf springs 5a and 5b will reach and contact with the case 2 and that limit of elastic deformation of the first and second leaf springs 5a and 5b is within the range.

The first inner guide 6a is provided on one side of the oscillatory actuator 1 in the direction of the oscillation axis O, being inner (i.e., closer to the center of the case 2) than the first leaf spring 5a in the direction of the oscillation axis O. The second inner guide 6b is provided on the other side of the oscillatory actuator 1 in the direction of the oscillation axis O, being inner (i.e., closer to the center of the case 2) than the first leaf spring 5a in the direction of the oscillation axis O. That is, the first and second inner guides 6a and 6b are inner in the case 2 than the first and second leaf springs 5a and 5b in the direction of the oscillation axis O. The first and second inner guides 6a and 6b are made of resin material, such as ABS. The material of the first and second inner guides 6a and 6b is however not limited to resin material.

Operation

The oscillatory actuator 1 with the configuration described above is such that, in a state where the first and second coils 21a and 21b are not energized (i.e., an equilibrium state), the mover 4 supported by the first and second leaf springs 5a and 5b are at the centers of the first and second coils 21a and 21b, as show in in FIG. 2.

In order to oscillate the mover 4, alternating currents are supplied to the first and second coils 21a and 21b via the terminal 12 in such directions that the first and second coils 21a and 21b generate the magnetic fields of opposite polarities, respectively. That is, the first coil 21a and the second coil 21b generate the same polarity adjacently.

For example, in the case of the polarities shown in FIG. 3, the mover 4 receives a thrust generated in the other way in the direction of the oscillation axis O (downward in FIG. 3), which is indicated by the solid arrow A. When the currents flowing through the first coil 21a and the second coil 21b are reversed, the mover 4 receives a thrust generated in the one way in the oscillation axis O (upward in FIG. 3), which is indicated by the dotted arrow B.

Thus, the energization of the first coil 21a and the second coil 21b with alternating currents causes the mover 4 to oscillate along the oscillation axis 9 upon the receipt of the thrust of electromagnetic force and the biasing forces exerted by the leaf springs 5a and 5b.

Note that the thrust generated in the mover 4 is basically in line with thrust given based on Fleming's left-hand rule. With the first coil 21a and the second coil 21b fixed to the case 2 in the present embodiment, the thrust on the mover 4 including the magnet 30 is a reaction force against the forces generated in the first coil 21a and the second coil 21b.

The thrust force is a result of contributions from horizontal components (components orthogonal to the axis of the magnet 30) of a magnetic flux extending from the magnet 30 of the mover 4 to the pole pieces 31a and 31b and from the sides of the pole pieces 31a and 31b to the yoke 20 via the coils 21a and 21b. The yoke 20 increases the horizontal components of the magnetic flux of the magnet 30.

The oscillatory actuator 1 according to this embodiment is such that, when the mover 4 is at a maximum displacement thereof in the one way in the direction of the oscillation axis O, the second pole piece 31b on the other side is displaced so that a part of the second pole piece 31b overlaps the first coil 21a on the one side. On the contrary, when the mover 4 at a maximum displacement in the other way in the direction of the oscillation axis O, the first pole piece 31a on the one side is displaced so that a part of the first pole piece 31a overlaps the second coil 21b on the other side.

During usual oscillation of the mover 4, the first and second leaf springs 5a and 5b elastically deform along the oscillation axis O and radially within the prescribed ranges in such a way that none of the mover 4 and the first and second leaf springs 5a and 5b will reach and contact with the first or second inner guide 6a or 6b.

On the other hand, the first and second leaf springs 5a and 5b will reach and contact with the first and second inner guides 6a and 6b in a case of excess oscillation of the mover 4, in which, for example, due to dropping of a device with the oscillatory actuator 1, the mover 4 oscillates excessively outward in the direction of the oscillation axis O beyond the positions thereof as illustrated in FIGS. 4A and 4B, so that the first and second leaf springs 5a and 5b move beyond the prescribed ranges. This restricts the mover 4 from moving further in the one way in the direction of the oscillation axis O, preventing the mover 4 from reaching and contacting with the case 2 (first cover case 11a).

In a case of radial impact (not illustrated) where the case 2 is subjected to an impact in the radial direction, the mover 4 also moves in the radial direction. In such a case, the movement of the mover 4 in the radial direction would cause the first and second leaf springs 5a and 5b to move in the radial direction beyond the prescribed ranges, eventually reaching and contacting with the first and second inner guides 6a and 6b.

(Relation between Average Length of Yoke and Mover)

Figure 5:
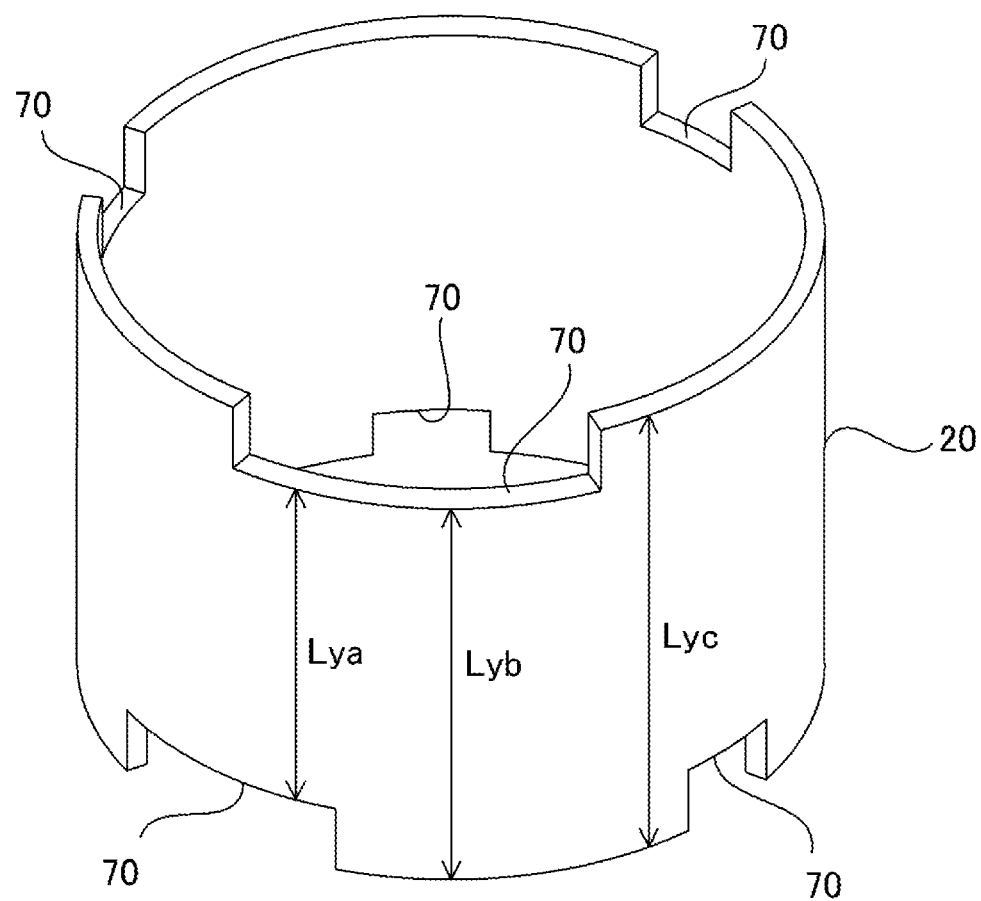
FIG. 5 is a perspective view of a yoke.
Figure 6:
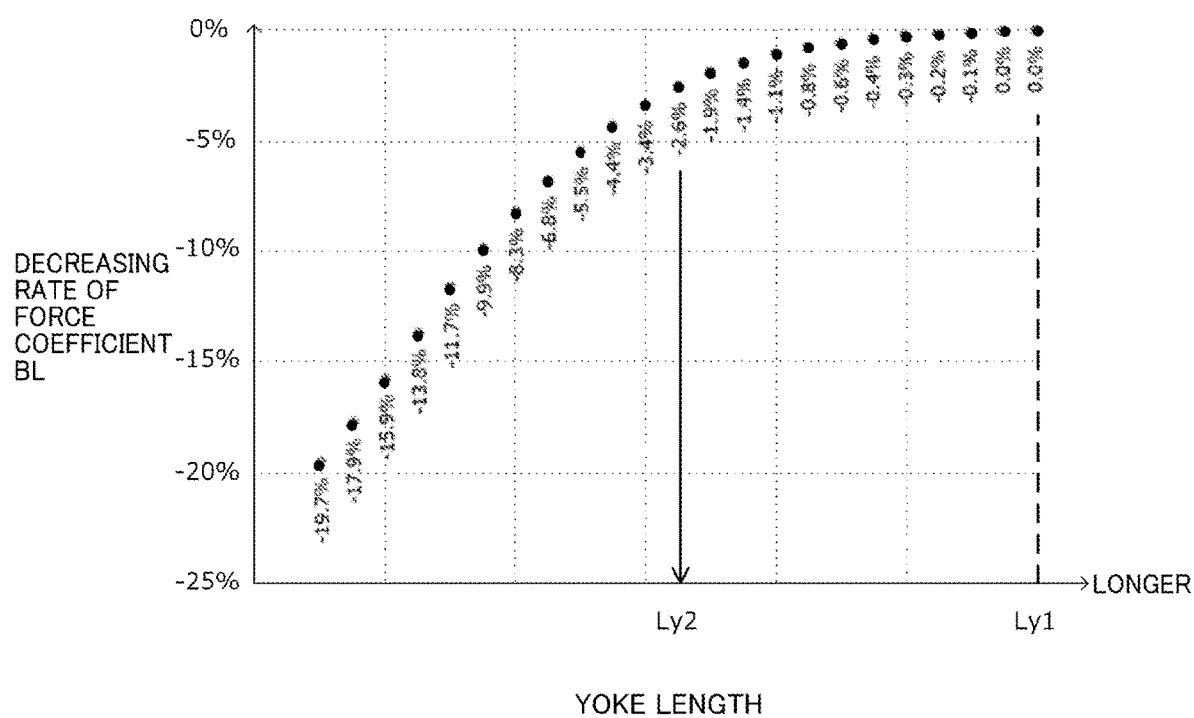
FIG. 6 is a graph showing the relationship between the yoke length and a force coefficient.

FIG. 5 is a perspective view of the yoke. FIG. 6 is a graph showing the relationship between the yoke length and a force coefficient. Now, the dimensional relationship among the parts of the oscillatory actuator according to this embodiment will be described with reference to FIGS. 5 and 6 as well as FIG. 2.

As shown in FIG. 2, the oscillatory actuator 1 is configured such that, along the oscillation axis, an average length Ly of the yoke 20 is greater than or equal to a length (Lp+2La), where Lp is an end-to-end length of the pair of pole pieces 31a and 31b and La is an amplitude, in either one way or other way, of oscillation of the mover 4, and the length (Lp+2La) is the sum of the length Lp and the double of the amplitude La.

As shown in FIG. 5, the yoke 20 has a plurality of cutouts 70 along each edge in the direction of the oscillation axis O for arranging wires and other components. More specifically, the yoke 20 according to this embodiment has three cutouts 70 as rectangular recesses along each edge. The cutouts 70 have the same depth but different circumferential lengths. The yoke 20 with the plurality of cutouts 70 in this manner has different lengths at different circumferential positions along the oscillation axis O. For example, as shown in FIG. 5, the circumferential surface of the yoke 20 has lengths Lya, Lyb, and Lyc. Lya is a length along the oscillation axis O at a position with cutouts 70 along both the edges. Lyb is a length along the oscillation axis O at a position with a cutout 70 along the one or the other edge and is longer than Lya. Lyc is a length along the oscillation axis O at a position without any cutout 70 along the one or the other edge and is longer than Lyb.

The total cutout area of the cutouts 70 along one edge of the yoke 20 is equal to the total cutout area of the cutouts 70 along the other edge. That is, the average lengths from the middle of the yoke 20 in either way in the direction of the oscillation axis O are equal to each other. This configuration allows even the yoke 20 with the cutouts 70 to exhibit an unbiased driving force for oscillating the mover 4, which is not biased to either the one side or the other side in the direction of the oscillation axis O, and thus achieves stable oscillations. Note that the shape and number of the cutouts are not limited thereto, and the plurality of cutouts may be in different shapes. Further, the total cutout areas of the cutouts 70 along the one and other edges of the yoke 20 are not necessarily equal to each other, but may be substantially equal to each other as long as not causing a biased magnetic flux from the yoke 20 to either one side or the other side in the direction of the oscillation axis O.

The average length Ly of the yoke 20 with such a configuration in the direction of the oscillation axis O is the average of the lengths from one edge to the other edge throughout the entire circumference of the yoke 20. That is, for example, the average length Ly is 10×0.3+11×0.4+12×0.3=11 mm, where 30% of the entire circumference of the yoke has a length of 10 mm, 40% has a length of 11 mm, and 30% has a length of 12 mm.

Referring back to FIG. 2, the end-to-end length Lp of the pair of pole pieces 31a and 31b is the total length of the magnet 30, the first pole piece 31a, and the second pole piece 31b of the mover 4 along the oscillation axis O, and corresponds to the length of the magnetic part of the mover 4.

The amplitude La is a displacement range from where the mover 4 is positioned in a non-oscillatory state (i.e., an equilibrium state) to where the mover 4 reaches by the displacement in either the one or the other way in the direction of the oscillation axis O in an oscillatory state. That is, the double of the amplitude La corresponds to the variation range, over which the mover 4 moves from the position that the mover 4 takes in the non-oscillatory state to the positions that the mover 4 reaches by the displacements in either way in the direction of the oscillation axis O in the oscillatory state.

With the configuration that the average length Ly of the yoke 20 is equal to or longer than the length (Lp+2La) which is the sum of the end-to-end length Lp of the pair of pole pieces 31a and 31b and the double of the amplitude La, the magnetic part (i.e., the magnet 30 and the pole pieces 31a and 31b) of the mover 4 always stays within the range of the yoke 20 even in an oscillatory state of the mover 4. In other words, the magnetic part of the mover 4 will not move beyond either edge of the yoke 20 even in an oscillatory state of the mover 4. The minimum length Lya of the yoke 20 along the oscillation axis O may be equal to or longer than the length (Lp+2La), which is the sum of the end-to-end length Lp of the pair of pole pieces 31a and 31b and the double of the amplitude La. Accordingly, this configuration ensures that the magnetic part of the mover 4 stays within the range of the yoke 20 even in an oscillatory state of the mover 4.

Now, description will be made with reference to FIG. 6. FIG. 6 is a graph showing a decreasing rate of the force coefficient BL against decreasing yoke lengths, where the decrease of the force coefficient BL starts from a first force coefficient BL1 of a first yoke length Ly1 which is sufficiently longer than the length Lp. Note that the values shown in FIG. 6 are simulation results using, as a model, an oscillatory actuator that is substantially in the same size as the oscillatory actuator 1 according to this embodiment and simplified, for example, by excluding the cutouts of a yoke. The force coefficient BL is a numerical value obtained by multiplying the horizontal components of the magnetic flux density in the magnetic gap formed between the pole pieces and the yoke by the effective wire length of the coil wires. The force coefficient BL is a parameter indicative of the driving force of oscillation of the oscillatory actuator.

As shown in FIG. 6, the first yoke length Ly1 being sufficient is such a yoke length that the increasing force coefficient BL along with an increase in the yoke length becomes saturated at the yoke length, and that corresponds to, for example, a length (Lp+4La) which is the sum of the end-to-end length Lp of the pair of pole pieces and the quadruple of the amplitude La.

As shown in FIG. 6, the force coefficient BL decreases with a decrease in the yoke length from the first yoke length Ly1. The second yoke length Ly2 in FIG. 6 is equal to a length (Lp+2La) which is the sum of the end-to-end length Lp of the pair of pole pieces and the double of the amplitude La. At a yoke length shorter than the second yoke length Ly2, the decreasing rate of the force coefficient BL becomes lower than −3%, and the force coefficient BL decreases at a higher rate against the decrease in the yoke length. In other words, it can be said that the second yoke length Ly2 corresponds to an inflection point of the decreasing rate of the force coefficient BL.

Therefore, when the yoke length is longer than the length (Lp+2La) which is the sum of the end-to-end length Lp of the pair of pole pieces and the double of the amplitude La, this length ensures a sufficient force coefficient even at a yoke length shorter than the first yoke length Ly1, thereby allowing the oscillatory actuator 1 to generate a sufficient driving force. Furthermore, when the yoke length is shorter than the length (Lp+2La) which is the sum of the end-to-end length Lp of the pair of pole pieces and the quadruple of the amplitude La, this length reliably provides a miniaturized oscillatory actuator capable of generating a sufficient driving force.

(Relationship between Inner Diameter of Yoke and Outer of Pole Pieces)

As shown in FIGS. 2 and 7, the oscillatory actuator 1 according to this embodiment is so configured that the inner diameter Cy of the yoke 20 is greater than the outer diameter Dp of the pole pieces 31a and 31b by 1.3 times or fewer.

Here, FIG. 7 is a table showing the force coefficients BL of oscillatory actuator models (hereinafter simply referred to as "models") with different outer diameters Dp of pole pieces, inner diameters Dy of a yoke, and outer diameters Dm of a magnet. FIG. 8 is a graph showing the decreasing rate of the force coefficient from the first yoke length Ly1 to the second yoke length Ly2 in each of the models shown in FIG. 7. In the simulations FIGS. 7 and 8, the first yoke length Ly1 is 16 mm and the second yoke length Ly2 is 10.5 mm.

FIG. 7 shows the model numbers of the oscillatory actuator models, the areas A1 to A4 in FIG. 8, feature points, the outer diameters Dp of the pole pieces, the inner diameters Dy of the yoke, the ratios (Dy/Dp) of the inner diameter of the yoke to the outer diameter of the pole pieces, second force coefficients BL2 with the second yoke length Ly2 of 10.5 mm, the first force coefficients BL1 with the first yoke length Ly1 of 16.0 mm, and the decreasing rates of the force coefficients (hereinafter simply referred to as "force coefficient decreasing rates") from the first force coefficient BL1 to the second force coefficient BL2.

FIG. 8 shows a force coefficient decreasing rate from the first force coefficient BL1 to the second force coefficient BL2 against the ratios of the inner diameter of the yoke to the outer diameter of the pole pieces in each of the model shown in FIG. 7. More specifically, the horizontal axis represents the ratio of the inner diameter of the yoke to the outer diameter of the pole pieces, while the vertical axis represents the force coefficient decreasing rate from the first force coefficient BL1 to the second force coefficient BL2. As shown in FIG. 8, the models can be roughly classified into areas A1 to A4 based on its tendency.

The model No. 1 in area A1 has a greater ratio of the inner diameter of the yoke to the outer diameter of the pole pieces of 1.338 than the other models, while a smaller magnet outer diameter Dm than the other models, thereby having a higher force coefficient decreasing rate of −4.80% than the other models.

The model Nos. 2 to 10 and 13 in area A2 have different outer diameters Dm of the magnet and the outer diameters Dp of the pole pieces but the ratios of the inner diameter of the yoke to the outer diameter of the pole pieces within the range from 1.2 to 1.3, thereby having decreasing rates lower than −3.0%.

The model Nos. 11 and 12 in area A3 have smaller force coefficient decreasing rates than −3.0% with the ratios of the inner diameter of the yoke to the outer diameter of the pole pieces as low as 1.170. This demonstrates that, with large outer diameters Dp of the pole pieces and small gaps between the coils and the pole pieces, the configuration as described above, for example, would not be sufficient to prevent the interference between the pole pieces 31a and 31b and the inner guides 6a and 6b.

The model No. 14 in area A4 distinguishably with a larger inner diameter Dy of the yoke than the other models but with a larger ratio of the inner diameter of the yoke to the outer diameter of the pole pieces of 1.315 than the other models, thereby having a force coefficient decreasing rate of −3.94%, which is relatively larger than the other models.

This demonstrates that the force coefficient decreasing rate can be kept lower than −3.0% when the ratio of the inner diameter of the yoke to the outer diameter of the pole pieces falls in the range of 1.3 or less including areas A2 and A3. On the other hand, this also demonstrates that the force coefficient BL rapidly decreases (i.e., the decreasing rate increases) when the ratio of the inner diameter of the yoke to the outer diameter of the pole pieces is higher than 1.3. Moreover, such a configuration with a ratio of the inner diameter of the yoke to the outer diameter of the pole pieces within a range of 1.2 or more but not more than 1.3 including area A2 reliably provides gaps between the coils and the pole pieces to some extent even in the case of miniaturization achieved with a smaller radial size, thereby preventing the interference of the pole pieces with the inner guides or other components, which ensures the durability of the oscillatory actuator.

As such, an inner diameter of the yoke greater than the outer diameter of the pole pieces by 1.3 times or fewer allows to provide a miniaturized oscillatory actuator capable of generating a sufficient driving force. Furthermore, an inner diameter of the yoke greater than the outer diameter of the pole pieces by 1.2 times or more ensures a sufficient durability.

(Positional Relationship between Centers of Coils and Centers of Pole Pieces)

As shown in FIG. 2, the oscillatory actuator 1 according to this embodiment is configured such that the centers Mc1 and Mc2 of the pair of coils 21a and 21b in the direction of the oscillation axis O are disposed more outward in the direction of the oscillation axis than the center Mp1 or Mp2 of the pole piece 31a or 31b disposed on the same side in a non-oscillatory state (i.e., an equilibrium state). More specifically, the center Mc1 of the coil 21a on the one side in the direction of the oscillation axis O is more outward in the direction of the oscillation axis O than the center Mp1 of the pole piece 31a on the one side in the direction of the oscillation axis O. Meanwhile, the center Mc2 of the second coil 21b on the other side in the direction of the oscillation axis O is more outward in the direction of the oscillation axis O than the center Mp2 of the pole piece 31b on the other side in the direction of the oscillation axis O.

In the positional relationship in a non-oscillatory state (i.e., an equilibrium state), the magnetic flux from the pole pieces 31a and 31b to the coils 21a and 21b partially diffuses not only radially but also along the oscillation axis O as indicated by the hollow arrows in FIG. 2. The spread of the magnetic flux is larger on the outer side in the direction of the oscillation axis O than on the inner side (the side toward the center) in the direction of the oscillation axis O. On the other hand, the coils 21a and 21b, located more outward than the centers of the pole pieces 31a and 31b in the direction of the oscillation axis O, can receive more magnetic flux thus diffused. As a result of this, the driving force in an oscillatory state of the mover 4 increases.

The present invention is not limited to the embodiment described so far.

DESCRIPTION OF REFERENCE CHARACTERS

1 Oscillatory Actuator
2 Case
3 In-Case Electromagnetic Driver
4 Mover
5a First Leaf Spring
5b Second Leaf Spring
6a First Inner Guide
6b Second Inner Guide
20 Yoke
21a First Coil
21b Second Coil
30 Magnet
31a First Pole Piece
31b Second Pole Piece
32a First Mass (Weight)
32b Second Mass (Weight).

The invention claimed is:

1. An oscillatory actuator, comprising:
a case made of a non-magnetic material;
an electromagnetic driver in a tubular shape inside the case;
a mover disposed radially inside the electromagnetic driver and oscillatably supported along an oscillation axis; and
a pair of leaf springs each configured to support either oscillation-axial end of the mover,
the mover including a magnet, a pair of pole pieces being made of a soft magnetic material and sandwiching the magnet from either side in the oscillation axis, and a pair of weights being made of a non-magnetic material and sandwiching the pair of pole pieces from either side in the oscillation axis,
the electromagnetic driver including a pair of coils, each in a cylindrical shape, spaced apart from each other along the oscillation axis, and a yoke in a tubular shape disposed radially outside the pair of coils, the yoke being made of a soft magnetic material and projecting outward beyond the pair of coils along the oscillation axis, and
along the oscillation axis, the yoke having an average length greater than or equal to a sum of an end-to-end length of the pair of pole pieces, serving as a magnetic part contributing to a thrust of the mover, and the double of a one-way amplitude of oscillation of the mover.

2. The oscillatory actuator of claim 1, wherein along the oscillation axis, the average length of the yoke is smaller than or equal to a sum of the end-to-end length of the pair of pole pieces and the quadruple of the amplitude of the oscillation of the mover.

3. The oscillatory actuator of claim 2, wherein the yoke has an inner diameter greater than an outer diameter of the pole pieces by 1.3 times or fewer.

4. The oscillatory actuator of claim 3, wherein centers of the pair of coils in the direction of the oscillation axis are more outward in the direction of the oscillation axis than centers of the pole pieces at same ends in a non-oscillatory state.

5. The oscillatory actuator of claim 3, wherein the yoke has an inner diameter greater than the outer diameter of the pole pieces by 1.2 times or more.

6. The oscillatory actuator of claim 5, wherein centers of the pair of coils in the direction of the oscillation axis are more outward in the direction of the oscillation axis than centers of the pole pieces at same ends in a non-oscillatory state.

7. The oscillatory actuator of claim 5, wherein the yoke with edges in the direction of the oscillation axis has one or more cutouts along each of the edges, and a total area of the cutouts of the one edge of the yoke is equal to a total area of the cutouts along the other edge.

8. The oscillatory actuator of claim 3, wherein the yoke with edges in the direction of the oscillation axis has one or more cutouts along each of the edges, and a total area of the cutouts of the one edge of the yoke is equal to a total area of the cutouts along the other edge.

9. The oscillatory actuator of claim 2, wherein centers of the pair of coils in the direction of the oscillation axis are more outward in the direction of the oscillation axis than centers of the pole pieces at same ends in a non-oscillatory state.

10. The oscillatory actuator of claim 9, wherein the yoke with edges in the direction of the oscillation axis has one or more cutouts along each of the edges, and a total area of the cutouts of the one edge of the yoke is equal to a total area of the cutouts along the other edge.

11. The oscillatory actuator of claim 2, wherein the yoke with edges in the direction of the oscillation axis has one or more cutouts along each of the edges, and a total area of the cutouts of the one edge of the yoke is equal to a total area of the cutouts along the other edge.

12. The oscillatory actuator of claim 1, wherein the yoke has an inner diameter greater than an outer diameter of the pole pieces by 1.3 times or fewer.

13. The oscillatory actuator of claim 12, wherein the yoke has an inner diameter greater than the outer diameter of the pole pieces by 1.2 times or more.

14. The oscillatory actuator of claim 13, wherein centers of the pair of coils in the direction of the oscillation axis are more outward in the direction of the oscillation axis than centers of the pole pieces at same ends in a non-oscillatory state.

15. The oscillatory actuator of claim 13, wherein the yoke with edges in the direction of the oscillation axis has one or more cutouts along each of the edges, and a total area of the cutouts of the one edge of the yoke is equal to a total area of the cutouts along the other edge.

16. The oscillatory actuator of claim 12, wherein centers of the pair of coils in the direction of the oscillation axis are more outward in the direction of the oscillation axis than centers of the pole pieces at same ends in a non-oscillatory state.

17. The oscillatory actuator of claim 12, wherein the yoke with edges in the direction of the oscillation axis has one or more cutouts along each of the edges, and a total area of the cutouts of the one edge of the yoke is equal to a total area of the cutouts along the other edge.

18. The oscillatory actuator of claim 1, wherein centers of the pair of coils in the direction of the oscillation axis are more outward in the direction of the oscillation axis than centers of the pole pieces at same ends in a non-oscillatory state.

19. The oscillatory actuator of claim 18, wherein the yoke with edges in the direction of the oscillation axis has one or more cutouts along each of the edges, and a total area of the cutouts of the one edge of the yoke is equal to a total area of the cutouts along the other edge.

20. The oscillatory actuator of claim 1, wherein the yoke with edges in the direction of the oscillation axis has one or more cutouts along each of the edges, and a total area of the cutouts of the one edge of the yoke is equal to a total area of the cutouts along the other edge.

* * * * *